(12) United States Patent
Diede

(10) Patent No.: US 7,377,690 B1
(45) Date of Patent: May 27, 2008

(54) HIGH TRIGGER TEMPERATURE LITHIUM INTERMETALLIC THERMAL SENSORS

(75) Inventor: Amos J. Diede, Ridgecrest, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 986 days.

(21) Appl. No.: 10/847,685

(22) Filed: May 13, 2004

(51) Int. Cl.
*B22F 3/02* (2006.01)
*G01K 11/00* (2006.01)
*G01K 13/00* (2006.01)

(52) U.S. Cl. .................. 374/159; 428/548; 102/364; 102/377; 374/100

(58) Field of Classification Search ............ None
See application file for complete search history.

(56) References Cited

U.S. PATENT DOCUMENTS 4,209,571 A * 6/1980 Bessett et al. .............. 429/7
4,804,275 A * 2/1989 Kang et al. ................. 374/162
5,006,429 A 4/1991 Pracchia et al.
5,466,537 A 11/1995 Diede et al.
6,267,864 B1 * 7/2001 Yadav et al. ................ 205/341

* cited by examiner

*Primary Examiner*—Gail Verbitsky
(74) *Attorney, Agent, or Firm*—Charlene A. Haley

(57) ABSTRACT

A non-electrical intermetallic thermal sensor with trigger temperatures in a range of 360° F. to about 430° F., comprising, a hermetically sealed housing including at least one layer of electronegative metal disposed in the housing, wherein the electronegative metal comprises tin (Sn), and at least one layer of active lithium/magnesium alloy disposed in the housing, wherein each layer(s) of active lithium/magnesium alloy is disposed in abutting interface with each layer(s) of electronegative metal. The intermetallic thermal sensors of the present invention further include at least one diffusion barrier means for inhibiting the diffusion of the active lithium/magnesium alloy layer into the electronegative layer.

20 Claims, 5 Drawing Sheets

HIGH TRIGGER TEMPERATURE LITHIUM INTERMETALLIC THERMAL SENSORS

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

FIELD OF THE INVENTION

The present invention relates to high trigger temperature lithium intermetallic thermal sensors having trigger temperatures above 360° F., and more specifically, high temperature lithium intermetallic thermal sensors to mitigate threats ranging from Fast-cookoff (FCO) through Slow-cookoff (SCO).

BACKGROUND OF THE INVENTION

As a result of several well-known tragic accidents and considerable experience with ordinance items exposed to a range of thermal stimuli, it has been found necessary to pursue technologies offering more satisfactory solutions to reducing or mitigating reaction response levels of munitions subjected to fast cook-off (FCO) and slow cook-off (SCO) threat stimuli. To be in compliance with Insensitive Munitions (IM) requirements, munitions are not permitted to exhibit a reaction response more violent than a burning or deflagration reaction when subjected to a FCO or SCO thermal environment. Likewise, new rocket/missile propulsion systems are required to meet insensitive munitions requirements in prevailing applicable standards. Currently, few unmodified propulsion systems meet the presently applicable FCO requirements and far fewer meet present SCO requirements. However, it has been demonstrated that solid propellant rocket motors properly equipped with the embodiments described in U.S. Pat. No. 5,466,537 (hereinafter referred to a the '537 patent) are able to pass SCO requirements.

The effectiveness of cook-off hazard mitigation systems that cut and/or otherwise vent a rocket motor case prior to ignition of the propellant mass by the endangering thermal stimulus has been demonstrated. In full-scale cook-off tests, dramatic reduction in the reaction violence of the motors has been obtained by implementing the active mitigation case venting approach. Nevertheless, cook-off hazard mitigation for rocket motors is a difficult engineering problem, and the technology is still immature, especially in the areas of slow cook-off mitigation and broad-spectrum cookoff mitigation which includes FCO, SCO, and all heating rates in between. New missile systems currently in the initial stages of construction and development are required to meet the insensitive munitions requirements before acceptance for use. Many will not be able to do so without advances in cook-off hazard mitigation technology.

At the present, one of the key problems in the development of a satisfactory case venting cook-off mitigation system is the lack of fully suitable thermal sensor technologies. Mechanical sensors which utilize passive sensor technology such as bimetal, memory metal, and/or wax motor actuators to sense and initiate a mitigation system have been built and tested, but are bulky and expensive. In addition, these constructs typically require an out of line device somewhere in the system. Electrically powered thermal sensors, active or passive, generally are not considered capable of meeting construct requirements for this application because of one or more of the following reasons: (1) the need for a reliable long-term power source, (2) the need for maintenance, (3) the possibility of system failure or an electrical short resulting in accidental triggering, (4) the difficultly of fool proofing and hardening the system so that it cannot be triggered by aero heating, electromagnetic pulse inputs, or any other stimuli except valid thermal threats, and (5) difficulty assuring electronic component reliability at elevated temperatures in a cook-off environment. For these reasons, virtually all current cook-off hazard mitigation systems are constructed around rather primitive thermal sensors, which utilize a pyrotechnic charge as the sensing element.

Pyrotechnic sensors typically respond reliably only to heating rates at the upper end of the heating rate continuum. Thus, current pyrotechnic based cook-off mitigation systems are unable to sense, respond to, or mitigate hazards presented by intermediate or slow cook-off. As a rule, pyrotechnics also lack precise, reproducible behavior, and their use raises safety issues regarding the mitigation system itself. Virtually all pyrotechnic-based mitigation systems require the implementation of a safe/arming subsystem, which impacts complexity, reliability, and cost.

U.S. Pat. No. 5,006,429 issued on Apr. 9, 1991, to Pracchia, et al. teaches an externally heated thermal battery (hereinafter referred to as the '429 patent). This is a lithium battery with an electrolyte, which is solid at normal ambient conditions. When the battery is heated by a sufficiently strong external heat source, such as a fire, the battery is heated until the electrolyte melts. As long as the electrolyte is solid, the battery is a rather inert device, as it cannot deliver an electrical current. Once the electrolyte melts, the electrolyte becomes conductive and the device gains the capability of delivering electrical energy. This electrical energy can then be used to fire a squib or detonator or some other initiator. In other words, the electrical energy is used to initiate an explosive or pyrotechnic train to mitigate an ordnance hazard.

The lithium intermetallic thermal sensors of the present invention are not batteries and do not at any time function as a cell or battery. The thermal batteries of the '429 patent utilize an electrolyte and have or utilize an electrode (anode or cathode). The thermal batteries deliver electrical energy and are used to electrically initiate a pyrotechnic or explosive train. The thermal batteries utilize electrochemical reactions which begin at a pre-selected temperature, as opposed to using intermetallic alloying reactions which trigger (bootstrap) at a pre-selected temperature. The thermal batteries function when its electrolyte melts as opposed to triggering when the lithium alloy melts. The thermal batteries deliver an electrical output and not a thermal output.

A significant problem with thermal batteries is that even though the thermal batteries are inert until a specified temperature, they are ultimately used to electrically fire a squib or detonator which contains sensitive primary explosives/energetics. Ordnance safety practices require electrically initiated squibs or detonators to be out-of-line until it is fired. In a cookoff environment (especially SCO) squib/detonator reliability becomes a major technical challenge. Some squibs/detonators will themselves cookoff prematurely or they gradually "dud" at elevated temperatures. Another issue was the time required for the battery electrolyte to melt and for the battery to come up to full power. Due to resultant complexity, cost, and reliability issues it was found to be difficult to implement thermal battery powered mitigation devices in a field-able system. These obstacles are not insurmountable, but they kept thermal type batteries from being utilized in insensitive munitions and prompted the search for another technology.

U.S. Pat. No. 5,466,537 issued on Nov. 14, 1995 to Diede et al., teaches intermetallic thermal sensors based upon eutectic or near eutectic lithium alloys in conjunction with a 63/37 tin/lead alloy, and is hereby incorporated by reference. These thermal sensors were constructed to trigger at several specific temperatures depending upon the composition (melting point) of the lithium alloy. Sensors with trigger temperatures of 270, 292, 305, 315, 332, and 353° F. were developed, tested, and successfully demonstrated. These sensors were developed to be incorporated into a specific weapon system to broaden the cook-off hazard mitigation capabilities of a previously constructed FCO thermally initiated venting system. Lithium intermetallic thermal sensors were incorporated into the thermally initiated FCO venting system to sense slow cook-off heating rates. No effort was made at that time to sense or mitigate thermal hazards presented by heating rates between FCO and SCO. Upon sensor activation by the SCO threat, the lithium intermetallic thermal sensor delivered a burst of thermal energy which successfully initiated an explosive case cutter, thus achieving case venting and an acceptable reaction level at the precise trigger temperature selected. This was accomplished without the use of sensitive electrically initiated squibs/detonators, and enabled the use of an insensitive in-line explosive system. In a FCO environment, the system employed a pyrotechnic sensor which was activated by direct flame impingement while the intermetallic thermal sensor remained insulated from the FCO environment. Mitigation system designers felt that the 270-353° F. trigger temperature of the lithium intermetallic thermal sensors was too low (in light of possible aero heat/jet exhaust exposure) to put these sensors near the exterior of the rocket motor so that a single intermetallic SCO sensor could respond to both FCO and SCO.

The Navy will not consider any thermal sensor in which there is even a remote chance of a failure mode resulting in the inadvertent triggering of a thermal hazard mitigation system. Conventional electric, electronic, or mechanical sensors were effectively ruled out as not reliable enough or do not trigger precisely enough to meet Navy requirements. Pyrotechnic sensors have applications limited to FCO applications. However, the lithium sensors of the above patent are unique in that they inherently cannot be triggered until the melting point of the lithium alloy is reached. Thus the trigger temperature is a very precise and reproducible value.

The following sensors in the '537 patent is hereinafter described in this section. Prior art FIGS. 1-4 depict structural embodiments of the intermetallic thermal sensors having trigger temperatures in the range of 270° F.-353° F. However, embodiments of thermal sensors of the present invention later described can also utilize the structures shown in FIGS. 1-4. In FIG. 1, the intermetallic thermal sensor 10 is shown comprising the housing 14 having an integral closed end and an opposite end having an extension 18 extending either from a continuous neck 16 of the housing 14 as depicted in FIG. 2 or from the end wall 15 depicted in FIG. 1. In FIG. 3, the liner 37 in the thermal well 38 has a portion external to the housing 14 that constitutes the housing extension 18.

The sensor in FIG. 2 shows the housing 14 with a continuous neck 16 and integral extension 18. A lid 17 is press-fit into the end of the housing 14 opposite the extension 18. Excess material is trimmed so that the lid surfaces are flush. The housing is then fixtured in an aluminum block that serves as a heat sink while the seam 15 is electron-beam welded. The housing 14 and lid 17 are fabricated from suitable steels including, but not limited to alloy 17-4PH, H900/950 condition. Within the housing 14 and abutting the surface of the lid 17 therein is the first wafer 21A of electronegative metal or alloy. Progressing toward the housing extension 18, the next layer is one of active (lithium/ lithium alloy) metal 23A. Another wafer 21B of electronegative metal followed by another of active metal 23B, and so on through alternating wafers 21C, and 21D of electronegative (tin/lead alloy) metal separated by layers 23C, and 23D of active metal until within the portion of the housing 14 in the neck 16 the stacking (sandwiching) of the alternating wafers 21 and layers 23 is concluded in this sensor with a wafer 21E.

The wafers or layers of active metal (lithium or lithium alloy) sandwiched in intimate contact with wafers of an electronegative metal or alloy form a stable system until the melting point of one or both metals (or alloys) is reached. In almost all cases the system is stable (unreactive) until the lithium or lithium alloy begins to melt. The electronegative metal or alloy are chosen so that it is still solid when the active metal melts. If a sensor was formulated so that the electronegative metal melts before the active metal, a runaway intermetallic reaction typically will not occur until the active metal also begins to melt, but the system is inherently unstable. This is an undesirable situation and is to be avoided. When the melting point of the lithium metal or lithium alloy has been reached, a spontaneous and vigorous, but gasless exothermic intermetallic reaction occurs which provides the energy to initiate the action of the mitigation system. For example, $7Li+2Sn \rightarrow Li_7Sn_2$ liberates approx 300 cal/g and $7Li+2Pb \rightarrow Li_7Pb_2$ liberates approx 165 cal/g. The resultant adiabatic reaction temperatures for these two reactions are approx 1900° F. and 1600° F. respectively. The reaction $2Li+Se \rightarrow Li_2Se$ liberates approx 910 cal/g and is very energetic.

In current sensor constructs, it is the melting temperature of the active metal that initiates the intermetallic reaction and triggers the sensor; therefore, the desired trigger temperature of the sensor is obtained by selecting a lithium alloy with the desired melting temperature. For example, in one application to mitigate the slow cook-off reaction of a particular rocket motor, a trigger temperature of approximately 330° F. is required. In another similar application a trigger temperature of 292° F. is required. Referring to FIG. 2, the composition of the active layers of metal pellets 23 which are of lithium metal determines the trigger temperature of the sensor.

Table 1 below gives several compositions and the resultant trigger temperatures of the sensor.

TABLE 1

Resultant Trigger Temperatures

| Li Alloy | Melting Temp ° F. | Trigger Temp. of Sensor. ° F. |
|---|---|---|
| Pure Lithium | 354-358 | 354 ± 2 degrees |
| 70% Lithium | 328-330 | 331 + 2 degrees |
| 30% Zinc | | −2 degrees |
| Eutectic | | |

TABLE 1-continued

Resultant Trigger Temperatures

| Li Alloy | Melting Temp ° F. | Trigger Temp. of Sensor. ° F. |
|---|---|---|
| 67% Lithium 33% Calcium Eutectic | 290-292 | 292 + 2 degrees −2 degrees |

Binary and tertiary alloys of lithium and the following metals enable the formulation of a wide variety of eutectic and single-phase alloys with very precise melting temperatures. The possible alloying constituents are: calcium, strontium, barium, zinc, aluminum, gallium, silver, platinum, palladium, and gold. Pure lithium or lithium alloys used in a sensor in the manner shown in FIG. 2, provide a wide variety of specific predetermined sensor trigger temperatures within the range of 270° F.-360° F. Li/Zn/Ag and Li/Zn/Ga/Ag alloys used as the active metal layers can be formulated to obtain trigger temperatures of 305° F., 310° F., 315° F. and 320° F.

The electronegative alloy chosen for the sensor shown in FIG. 2 is a eutectic alloy of 63% tin and 37% lead which melts at 361° F. This alloy was chosen in the '537 patent because it provides a sharper trigger response than any other electronegative metals/alloys tested in an extensive test matrix. The tin/lead alloy worked equally well with pure lithium as well as lithium/zinc and lithium/calcium alloys.

The reactions of most elemental electronegative metals with lithium and lithium alloys were evaluated. Many binary and tertiary electronegative alloys (most were tin based) were also tested and evaluated. The metals considered were: tin, lead, bismuth, indium, cadmium, antimony, thallium, zinc, and the semi-metals selenium and tellurium. The conclusion was that selenium (which does not form usable alloys) yielded the most impressive heat release but did not trigger in a reproducible manner when pressed in direct contact with the lithium alloy. Furthermore, selenium when used by itself liberates small, but significant and undesirable amounts of vapor during the reaction, and selenium is brittle and cannot be fabricated into wafers. The electronegative alloy that yielded the best overall performance in the packaging arrangement shown in FIG. 2 was the eutectic tin/lead alloy.

The number and thickness of the individual wafers was empirically determined by measuring the peak temperature obtained from sensors fabricated with different wafer dimensions. When many thin wafers are used, the reaction rate is higher, but there is more surface area for diffusion during slow heating rates and fabrication/assembly costs are higher. Increasing the thickness of the wafers and correspondingly reducing the number of wafers did not affect sensor performance significantly until the number of lithium wafers was less than 4. In the embodiment in FIG. 2 the wafers or layers of lithium metal/alloy were 0.358 inch in diameter and approximately 0.10 inch thick. The tin/lead alloy wafers were also 0.358 in diameter, but were 0.035 inches thick, except for wafer 21E which was 0.018 inches thick.

The electronegative alloy wafer 21E in contact with the metallic selenium pellet 25 is made thinner than the others so that unreacted lithium would be available near the selenium pellet. The idea is that the intermetallic reaction will heat the mass of the sensor and deliver hot unreacted lithium to the selenium pellet at the right time to ensure rapid and full energy release between the lithium and selenium. The lithium/selenium reaction was chosen because it is the only candidate reaction capable of reliably igniting a thermite charge 24.

In the sensor depicted in FIG. 2, the deposit of thermite 24 is located within the extension 18 abutting the surface of wafer 21E facing the extension 18. The thermite charge 24 is pressed into the extension 18 of the sensor 10. Thermite is typically a stoichiometric mixture of red iron oxide ($Fe_2O_3$) and aluminum powder. In the sensor of FIG. 2 the thermite composition is 67.15% $Fe_2O_3$, 23.87% H-15 aluminum powder, 6% $V_2O_5$ ultra fine powder, and 2.98% H-3 aluminum powder. The $V_2O_5$ was incorporated into the thermite formulation to make the thermite easier to ignite. The thermite is thoroughly mixed and sifted through a screen with a 425 micron hole size. A charge of 0.425 g of thermite was pressed into the sensor tip with a pressure of 4000 psi. Thermite is extremely difficult to "ignite", even with the addition of $V_2O_5$, requiring a temperature of >2000° F. for reliable ignition. However, the very energetic lithium/selenium reaction easily initiates the thermitic redox reaction. Once ignited, the reaction $Fe_2O_3+2Al\rightarrow 2Fe+Al_2O_3$ yields molten iron and aluminum oxide at 5200° F. The reaction is unique in that although it is very energetic, it is difficult to initiate, and the reaction yields little gas. The thermite increases the energy density and peak temperature at the tip of the sensor 10 when the sensor triggers. The tremendous burst of thermal energy provided by the thermite enables the sensor to instantly initiate very insensitive explosive train components. This allows an in-line system; an arrangement that is not possible if an electrically initiated squib or detonator is used with a thermal battery. In summary, the peak temperature reached by the intermetallic reaction is not high enough to instantly initiate an insensitive pyrotechnic/explosive train, and is also not sufficient to reliably ignite a thermite charge 24. However, the intermetallic reaction successfully and reliably initiates a selenium/lithium reaction which successfully and reliably initiates the thermite reaction—which in turn is used to thermally initiate the most insensitive pyrotechnic/explosive train of suitable composition. The selenium trigger pellet 25 of mass equal to 45-50 mg is placed between the thermite 24 and the tin/lead wafer 21E because it is incompatible with lithium but is perfectly compatible with both thermite and the tin/lead alloy. It is embedded in the thermite charge and flush with the surface of the thermite. The selenium used must be the grey or metallic allotrope which melts at 217° C.

In FIG. 2, the sensor 10 is 1.2 inches long and 0.375 inch in diameter. It should be further observed that copper-plating 22 is electroplated to each side of wafers 21A, B, C, D, and E, in a copper cyanide/sodium carbonate/Rochelle salt bath at 130° F. to deposit 3-4 mg of copper per wafer to a nominal thickness of 0.0001 inch.

In a 6° F./hr slow cook-off environment, the sensor spends many hours at elevated temperatures near the intended trigger temperature before the lithium alloy actually melts. Due to the fact that the lithium atom is extremely light, lithium diffuses an appreciable depth into the tin alloy wafers at elevated temperatures and forms a layer (crust) of intermetallic reaction products before the lithium alloy actually melts. This process does not necessarily dud the sensor, but slows the triggering speed and reduces the peak temperature. It was found that electroplating the tin/lead wafers with 0.0001 inch of copper significantly reduced the diffusion interaction between the lithium and electronegative metals. When the lithium melts, the copper is dissolved by the molten lithium and the intended intermetallic reaction is free to occur.

In FIG. 3, the housing 14 is structurally similar to the embodiment in FIG. 2. A first washer-shaped wafer of electronegative material 30 abuts the closed end wall 19 inside the housing 14 created by the lid 17. As shown in FIG. 3 the next wafer is a washer-shaped wafer of lithium alloy. 34. This wafer is followed by another washer-shaped wafer of electronegative material. The assembly of alternating washer-shaped wafers of electronegative metal 30 and active metal 34 continues until a sensor 10 of the appropriate size for the particular application is produced. Active metals for use in the sensor 10 are as described above.

The washer-shaped wafers 30 and 34 when stacked or assembled as described result in there being created a thermal well 38 centrally and symmetrically extending along the longitudinal axis 40 of the sensor. A liner 37 typically fabricated from steel is inserted in the well thus created and welded to the housing 14 at the seam weld 46. A compound or material capable of ignition and/or the production of a sudden volume of gas when the sensor triggers, is packed in the liner 37 of the thermal well 38. The ignition/decomposition of the material 38 serves to ignite a cutting charge or drive a piston to actuate a venting device. Materials including boron-potassium nitrate ($BKNO_3$), some other energetic material, or fuse compositions are examples of charges that can be deposited in the well 38.

Operation

The intermetallic cook-off hazard sensor 10 employs the intermetallic alloying reactions which occur between the active metals and the electronegative metals or their respective alloys fabricated in intimate contact with each other inside the sensor housing. The intimate contact is achieved by fabricating the metal reactants as wafers 21A-21E of electronegative metal or alloy wafers alternating with layers of active metal 23A-23D. FIG. 2 depicts a sensor as alternating washer-shaped wafers 34 and 30 of active metal or alloy and electronegative metal or alloy, respectively, FIG. 3 depicts another sensor.

In FIG. 2, when the temperature to which the sensor 10 is subjected reaches the melting point of the active metal 23, a spontaneous and vigorous, but gasless exothermic intermetallic reaction occurs. This reaction is inhibited until the active metal, lithium/lithium alloy in this sensor discussed above, begins to melt or has completely melted. The electronegative metal is electroplated with a 0.0001 inch layer 22 of copper or separated from the active metal by a 0.0001 inch foil of copper to reduce the diffusion of the lithium into the tin alloy wafers, in this case described. Such diffusion would adversely affect sensor 10 performance by reducing triggering speed and peak temperature in an unpredictable manner. When the active metal begins to melt, the copper is dissolved by the molten lithium/lithium alloy. Once the copper coating is compromised, the intermetallic reaction initiates and the exothermic output in turn "ignites" the selenium trigger pellet 25. The pellet 25 reacts vigorously with lithium to produce the heat required to reliably ignite the thermite 24 in the housing extension 18. The energy released is sufficient to heat the tip of the sensor in excess of 1500° F. The resulting thermal output of the sensor is then used to initiate a slow cook-off mitigation systems or other similar application.

In the sensor described above in FIG. 3, washer-shaped wafers or layers of active metal or alloy and electronegative metal or alloy, respectively, are introduced in alternating layers into the sensor housing 14. Other wafer arrangements can also be utilized. Thus, when washer-shaped layers or wafers, for example, of an active metal or active metal alloy are sandwiched in intimate contact with washer-shaped layers or wafers of an electronegative metal or alloy, a stable intermetallic system having an integral thermal well 38 is formed until the melting point of one or both of the metals or alloys is reached. Here again an electroplated layer of copper on the electronegative metal or a copper foil separator between the layers is used as an inhibition to manage diffusion of one reactant into the other to the detriment of sensor 10 performance, as discussed above. When the melting point of the lithium based metal is reached, a vigorous, but gasless, exothermic intermetallic reaction occurs which can then be used to initiate the action of an energetic compound or material deposited in the thermal well 38 and thus trigger the mitigation system to which the sensor 10 is coupled. Examples of particular compounds or materials which are deposited in wells 38 and other applications include $BKNO_3$, various propellants/explosives, pyrotechnics, or any substance that yield gas upon heating. The gas released by ignition or decomposition can be used in conjunction with a piston placed in the liner 37 to move the piston and actuate a detonator. Alternately, the sensor can be used to directly ignite an energetic material train. An intermetallic fuse wire composed of palladium and aluminum or nickel and aluminum may also be initiated by the thermal output of the sensor.

The sensors 10 are inherently inactive until subjected to an external thermal stimulus at a temperature in excess of the precisely predetermined trigger temperature. The sensor is free from premature triggering, does not exhibit undesirable hysteresis effects, and cannot be triggered by shock, electrostatic, EMP, friction, electromagnetic effects, or impact. By adjusting the composition and thus the melting point of the lithium/lithium alloy constituent in the sensor 10, trigger temperatures between 270° F. and 353° F. can be obtained.

When the lithium intermetallic thermal sensors of the above patent were developed, it was believed impossible to achieve trigger temperatures higher than 353° F., the approximate melting temperature of pure lithium. The reason is that the alloying of two metallic elements to form an alloy almost always results in melting point depression. Pure lithium metal yields sensors that trigger at approximately 353° F. The trigger temperature is a few degrees below the actual melting point of lithium due to rapid diffusion of the rather mobile lithium atoms just prior to melting. Thus, 353° F. was seen as the upper practical trigger temperature for lithium intermetallic thermal sensors.

There exists a need in the weapons systems community for an intermetallic thermal sensor having a sensor trigger temperature higher than 353° F.

SUMMARY OF THE INVENTION

The present invention relates to non-electrical intermetallic thermal sensors with high trigger temperatures, comprising, a hermetically sealed housing including at least one layer of electronegative metal disposed in the housing, wherein the electronegative metal comprises pure tin (Sn), and at least one layer of active lithium/Magnesium alloy disposed in the housing, wherein each layer(s) of active lithium/Magnesium is disposed in abutting interface with each layer(s) of electronegative metal. These sensors have trigger temperatures as high as 430° F.

Other embodiments of the intermetallic thermal sensors of the present invention further include at least one diffusion barrier means for inhibiting the diffusion of the active lithium/Magnesium alloy layer into the electronegative layer. In embodiments of the sensors, each diffusion barrier means is disposed upon a surface of one layer in abutting contact with a surface of other layer. In other embodiments, each diffusion barrier means is an electroplated metal layer that is dissolved by the active lithium/Magnesium alloy upon melting. In yet other embodiments, the diffusion barrier means for inhibiting the diffusion of the active lithium/Magnesium alloy layer into the electronegative layer is a gaseous layer.

In other embodiments of the present invention, the sensors could be made of two concentric cylinders (one cylinder of lithium/lithium alloy and the other cylinder of tin/tin alloy). This is an easy geometry to fabricate and the configuration would make it easy to support the cylinders from the ends so that a thin gap separates them. This would simplify construction and would be a more effective way to prevent diffusion than copper electroplating. In yet other embodiments, the sensor could also be made as a jelly roll. One could lay down one layer of lithium, one layer of copper foil, and one layer of tin. This three-layer strip could the be rolled up into a roll like a jelly roll and inserted into a cylindrical container. These embodiments include alternative ways to fabricate the sensor. The sensors would function in the same manner.

It is to be understood that the foregoing general description and the following detailed description are exemplary and explanatory only and are not to be viewed as being restrictive of the present invention, as claimed. Further advantages of this invention will be apparent after a review of the following detailed description of the disclosed embodiments, which are illustrated schematically in the accompanying drawings and in the appended claims.

Figure 4:
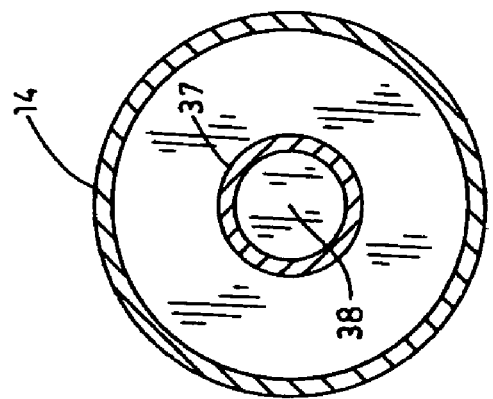
FIG. 4 is a prior art illustration and front cross-sectional view of the embodiment of the intermetallic thermal sensor taken along 3-3 in FIG. 3 and is hereby incorporated by reference.
Figure 1:
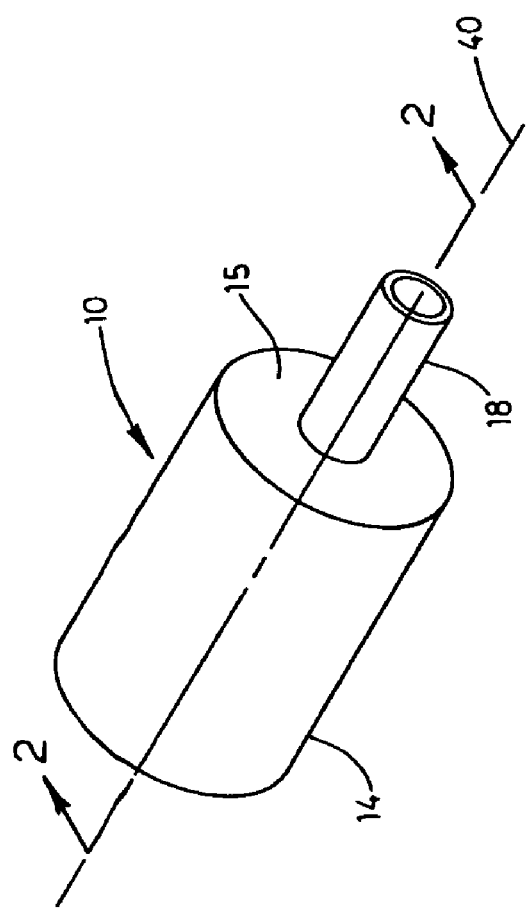
FIG. 1 is a prior art illustration and perspective view of an embodiment of the intermetallic thermal sensors according to the present invention and is hereby incorporated by reference.
Figure 2:
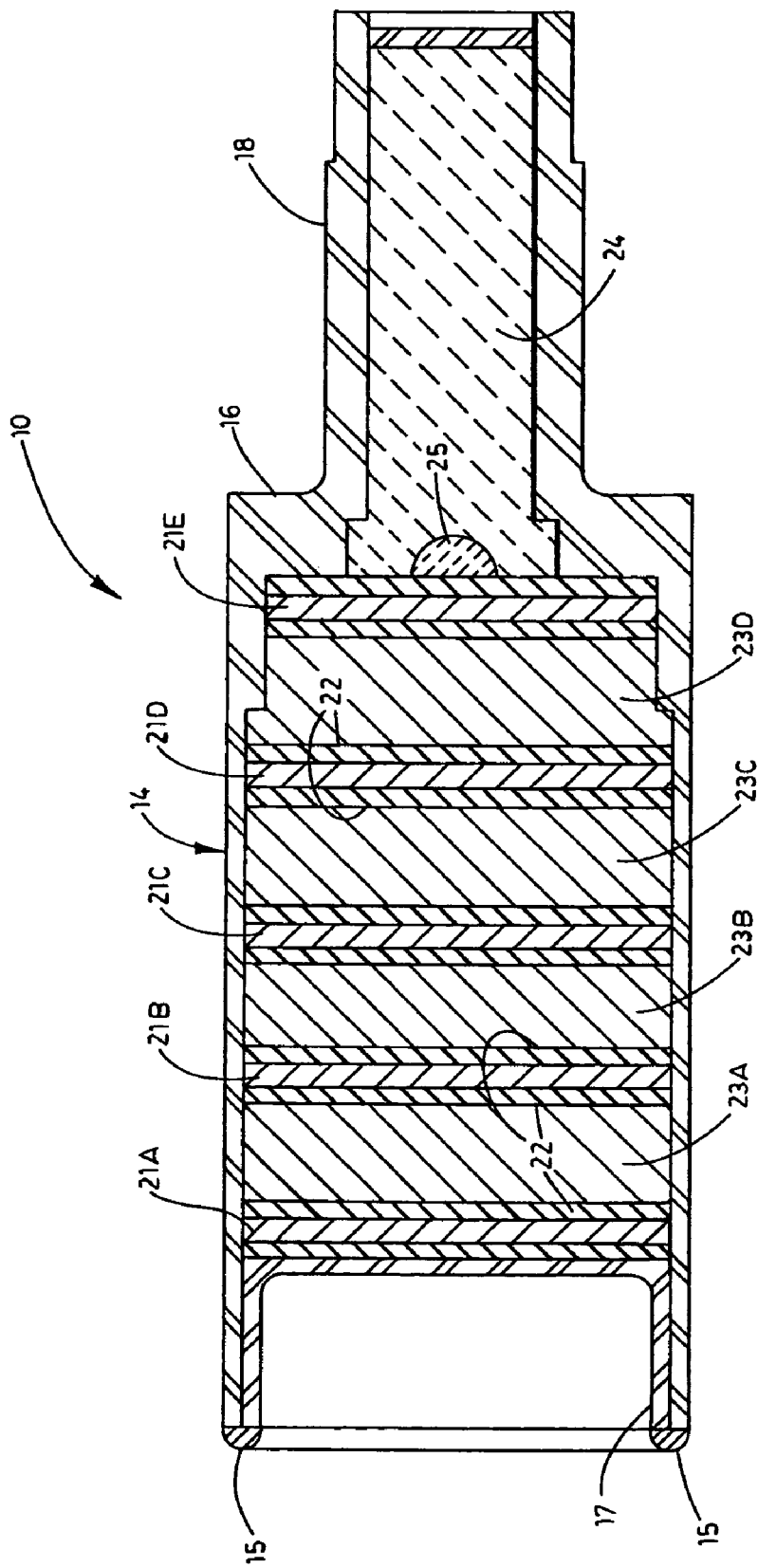
FIG. 2 is a prior art illustration and side cross-sectional view of the embodiment of the intermetallic thermal sensor taken along line 2-2 in FIG. 1, according to the present invention and is hereby incorporated by reference.
Figure 3:
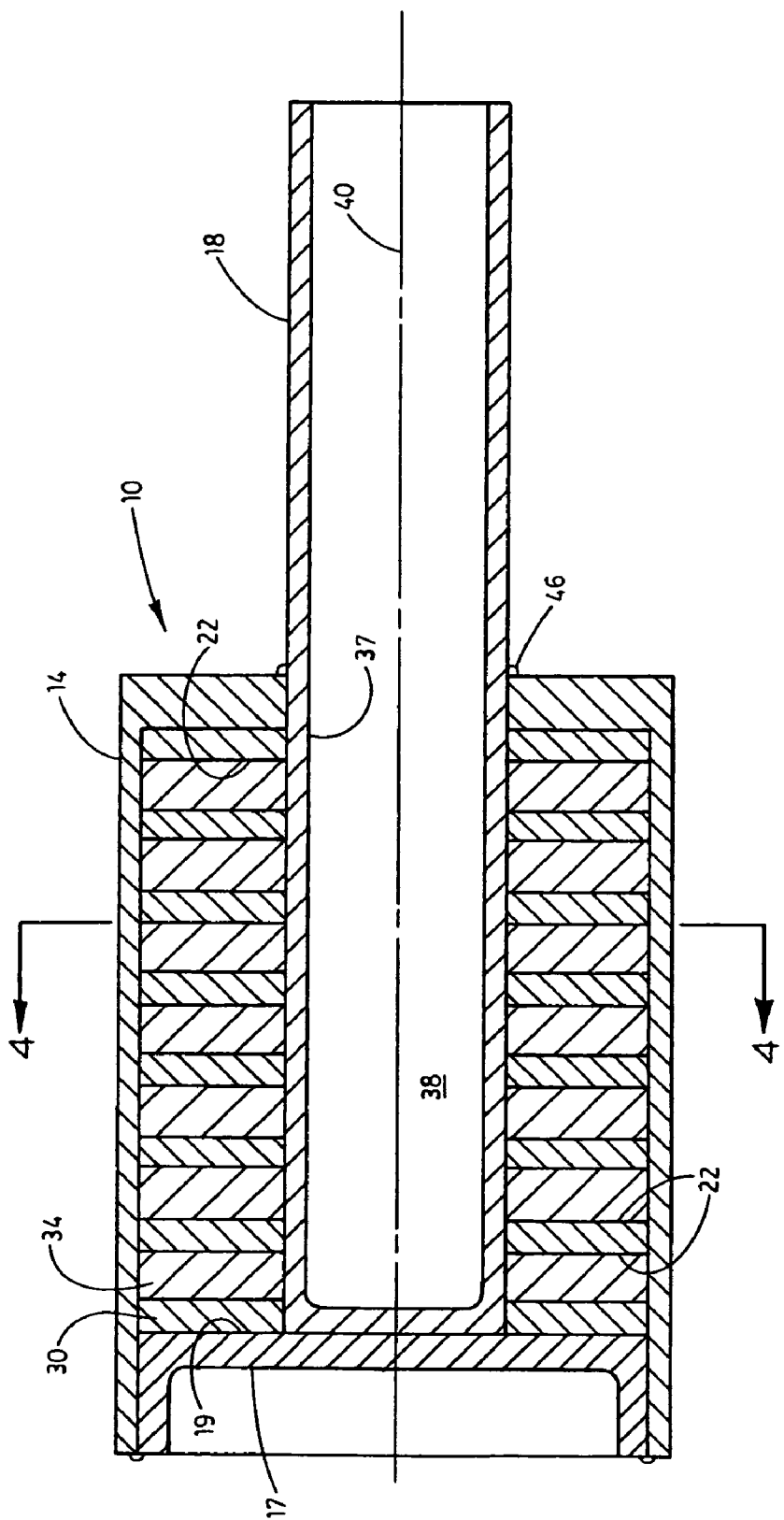
FIG. 3 is a prior art illustration and side cross-sectional view of another embodiment of an intermetallic thermal sensor taken along line 2-2 in FIG. 1, according to the present invention and is hereby incorporated by reference.

The prior art drawings in FIGS. 1-4 are applicable constructions of the present intermetallic thermal sensors.

DETAILED DESCRIPTION OF THE INVENTION

The present invention relates to non-electrical intermetallic thermal sensors with high trigger temperatures, comprising, a hermetically sealed housing including at least one layer of electronegative metal disposed in the housing, wherein the electronegative metal comprises pure tin (Sn), and at least one layer of active lithium/Magnesium alloy disposed in the housing, wherein each layer(s) of active lithium/Magnesium alloy is disposed in abutting interface with each layer(s) of electronegative metal. In other embodiments, the metals could also be in the configuration of concentric cylinders separated by a space.

The intermetallic thermal sensors of the present invention do not require a diffusion barrier if used to sense and mitigate FCO and ICO. In slow heating rate, SCO applications the sensors include at least one diffusion barrier means for inhibiting the diffusion of the active Lithium/Magnesium alloy layer into the electronegative layer. In embodiments of the sensors, each diffusion barrier means is disposed upon a surface of one layer in abutting contact with a surface of other layer. In other embodiments, each diffusion barrier means is an electroplated metal layer deposited on the electronegative wafer. The electroplated layer is dissolved and removed by the lithium magnesium alloy upon melting. The electroplated layer includes metal comprising a thin layer of copper or nickel, but typically copper. The electroplated layer includes a thickness in a range of about 0.0001 to about 0.0002 inch. In other embodiments, the diffusion barrier means for inhibiting the diffusion of the active Lithium/Magnesium alloy layer into the electronegative layer is an inert gaseous layer or an evacuated space. In yet other embodiments, a suitable polymeric layer is also used.

The intermetallic thermal sensors of the present invention include layer(s) of electronegative metal comprising pure tin (Sn), which is substantially free of impurities. Other embodiments of the present invention include a variety of electronegative metals/alloys to be used successfully as long as the melting point of the electronegative alloy is equal to or greater than the melting point of the lithium alloy. Nevertheless, pure tin yields good performance and simplicity and was chosen for experimental results. In embodiments, the layer of active Lithium/Magnesium alloy is wafer-shaped and the layer of electronegative metal is wafer-shaped. In yet other embodiments, the layer of active Lithium/Magnesium alloy is washer-shaped and the layer of electronegative metal is washer-shaped. Yet still in other embodiments, the two metals are configured into two or more concentric cylinders separated by a thin gap/space or jelly roll configuration.

In embodiments of the intermetallic thermal sensors, each layer(s) of electronegative metal comprises tin pure (Sn), each layer(s) of active Lithium/Magnesium alloy comprises about 75 weight % to about 99 weight % of Lithium (Li), and about 1 weight % to about 25 weight % Magnesium (Mg). In other embodiments, each layer(s) of electronegative metal comprises pure tin (Sn), each layer(s) of active Lithium/Magnesium alloy comprises about 80 weight % to about 90 weight % of Lithium (Li), and about 10 weight % to about 20 weight % Magnesium (Mg).

The sensors of the present invention include high trigger temperatures in a range of about 360° F. to about 430° F. In other embodiments, the sensors include high trigger temperatures in a range of about 380° F. to about 405° F.

The intermetallic thermal sensors of the present invention include a housing having a centrally disposed tubular-shaped extension from one end of the housing and a continuous neck transitioning the housing into the extension. One arrangement of the intermetallic thermal sensor includes stacking of the washer-shaped layers in the housing defining a well. Embodiments of the sensors further comprising a deposit of thermite within the housing extension and in abutment with the last of the layers disposed in the end of the housing adjoining the extension. In other embodiments, the sensors further comprise a thermite trigger pellet of metallic selenium disposed between the thermite and the abutting surface of the last layer disposed therein. In embodiments where a thermite charge is utilized, the trigger pellet is composed of metallic selenium.

The Navy is presently investigating the possibility of raising sensor trigger temperatures to approximately 380° F. and higher. At first this seemed impossible. Previous sensor technology utilizing pure lithium and 63/37% Sn/Pb alloy yielded a trigger temperature of 353° F. which is near the melting point of pure lithium. Typically alloying lithium with other metals results in a melting point depression—which would lower trigger temperature. Furthermore, the 63/37% tin/lead eutectic alloy with a melting point of 361° F. would not be suitable for use in sensors which trigger above 361° F. In previous sensors, the lead in the tin/lead alloy facilitated the intermetallic reaction and increased trigger rates and peak thermal output. Although the mechanism for this was not understood, experience indicated that eliminating the lead could slow the intermetallic reaction rate to unacceptable levels. Furthermore, there was speculation (reason to believe) that the presence of magnesium in the intermetallic reaction zone may slow or foul the reaction and render the sensors useless.

However, an unrelated study of the lithium-magnesium alloy system including a phase diagram found in the following reference indicated that as the magnesium content increases, the liquidus AND solidus lines rise upward in unison ("Binary Alloy Phase Diagrams," Volume 3, Published by the *American Society for Metals*, Metals Park, Ohio 44073, Thaddeus B. Massalski Editor-in-Chief, 1992). This is unusual and quite unique as few binary alloy systems do this. Thus, with the data from the lithium-magnesium phase diagram, it was believed to be possible to construct lithium sensors with trigger temperatures greater than 360° F. Experimental testing was needed to test this theory since the magnesium content of the alloy could adversely affect sensor performance.

A matrix of prototype lithium-magnesium intermetallic thermal sensors was fabricated to assess concept feasibility. It was decided to utilize two compositions for the tin wafers, a tin(Sn)/silver(Ag) eutectic alloy and pure tin. The tin/silver eutectic alloy comprised of 96.5% tin with 3.5% silver. This eutectic alloy melts at 430° F., which is closer to the melting point of the lithium/magnesium alloys than pure tin, which melts at approximately 450° F. In addition, it was believed that as soon as the intermetallic reaction initiates, the silver should alloy with the lithium, suddenly lowering the lithium alloy melting point and increasing fluidity. Thus, it was believed that the presence of the silver should facilitate the triggering of these sensors. Tests showed that just the opposite was true. The presence of the silver in the tin alloy clearly interfered with the triggering of these sensors. Sensors with the tin/silver alloy triggered slowly and reached peak temperatures of only about 700° F. It seems that silver-magnesium intermetallics were responsible for impeding the desired intermetallic reaction. On the other hand, excellent results were obtained with intermetallic thermal sensors of the present invention, which utilized pure tin wafers. This is a significant finding which greatly expands previous technology.

The present invention will now be explained with references to the following non-limiting experiments.

EXPERIMENTAL RESULTS

A series of intermetallic thermal sensors utilizing alternating layers of lithium/magnesium alloy and pure tin wafers were prepared and tested. In the first experiment, "Sensor A" the active lithium/magnesium alloy has: 18 by weight % of Magnesium; 82 by weight % of Lithium; and the wafers were constructed having a thickness of about 0.120 inches. The electronegative metal layers included wafers of pure Tin (Sn) (99+% substantially pure) and the wafers were constructed having a thickness of about 0.030 inches. Thermocouple data clearly indicated that a quasi isothermal range was entered at approximately 391° F., which represents the approximate solidus temperature for the alloy. The quasi isothermal range extended to 395° F., the apparent/effective liquidus line for this composition. The sensor triggered at 405° F. Thus there is a brief period between melting and triggering. The reason for this in not fully understood. Upon triggering, the sensor showed outstanding results and reached a peak temperature of 1309° F. Table 2 below gives several compositions and the resultant trigger temperatures of the embodiments of the present intermetallic thermal sensors.

TABLE 2

Resultant Trigger Temperatures

| Li Alloy | Trigger Temp. of Sensor ° F. |
| --- | --- |
| Pure Lithium | 353 ± 2 degrees |
| Sensor A:<br>82% Lithium;<br>18% Magnesium;<br>99% Tin | ~405 +/− 2 degrees |
| Sensor B:<br>90% Lithium;<br>10% Magnesium;<br>99% Tin | ~380 +/− 2 degrees |

In the second experiment, "Sensor B" the active lithium/magnesium alloy has: 10 by weight % of Magnesium; 90 by weight % of Lithium; and the wafers were constructed having a thickness of about 0.100 inches. The electronegative metal layers included wafers of pure Tin (Sn) (99+% substantially pure) and the wafers were constructed having a thickness of about 0.030 inches. Thermocouple data indicated a quasi isothermal range of 373-375° F. for this sensor composition. This corresponds to the effective non-equilibrium solidus and liquidus, respectively for the 90% Li, 10% Mg alloy. The sensor triggered at 380° F. The sensor showed outstanding results and reached a peak temperature of 1431 Deg F., which indicates excellent performance. Table 2 above gives several compositions and the resultant trigger temperatures of the embodiments of the present intermetallic thermal sensors.

Figure 5:
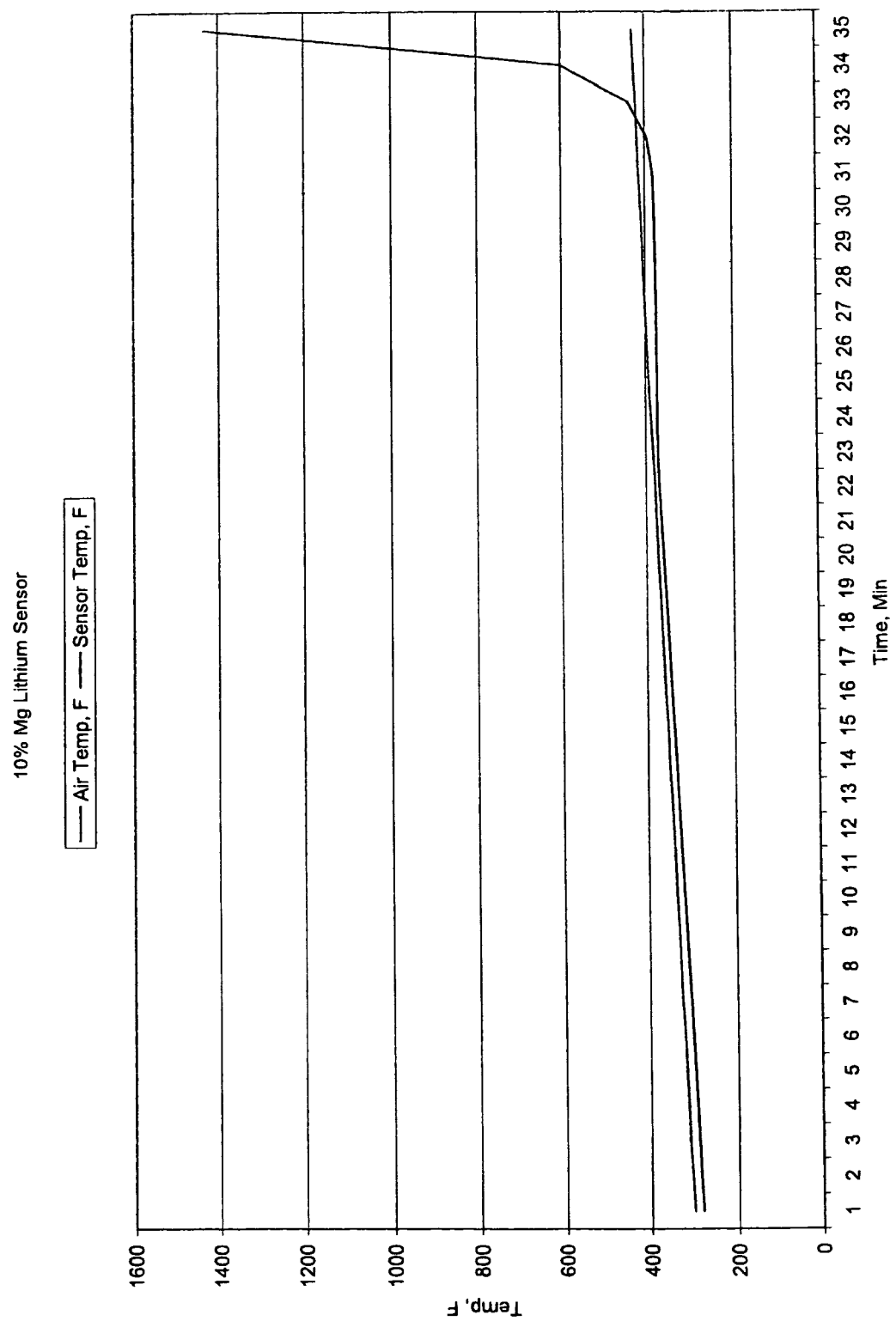
FIG. 5 is a graph showing sensor performance vs time for intermetallic thermal sensors having 10% Magnesium according to the present invention. This data is for the intermetallic core of the sensor only without selenium or thermite.

FIG. 5 shows thermocouple data of temperature vs time for Sensor B. The straight line is a plot of air temperature vs time which is a straight line with a slope of approx 200° F./hr. The second line is a plot of sensor temperature vs time. FIG. 5 shows that the sensor temperature follows air temperature with a constant gradient until alloy melting and the resultant exothermic intermetallic reaction initiates. The intermetallic reaction is a little sluggish at first, but increases exponentially until the peak temperature of 1431° F. is reached.

Figure 6:
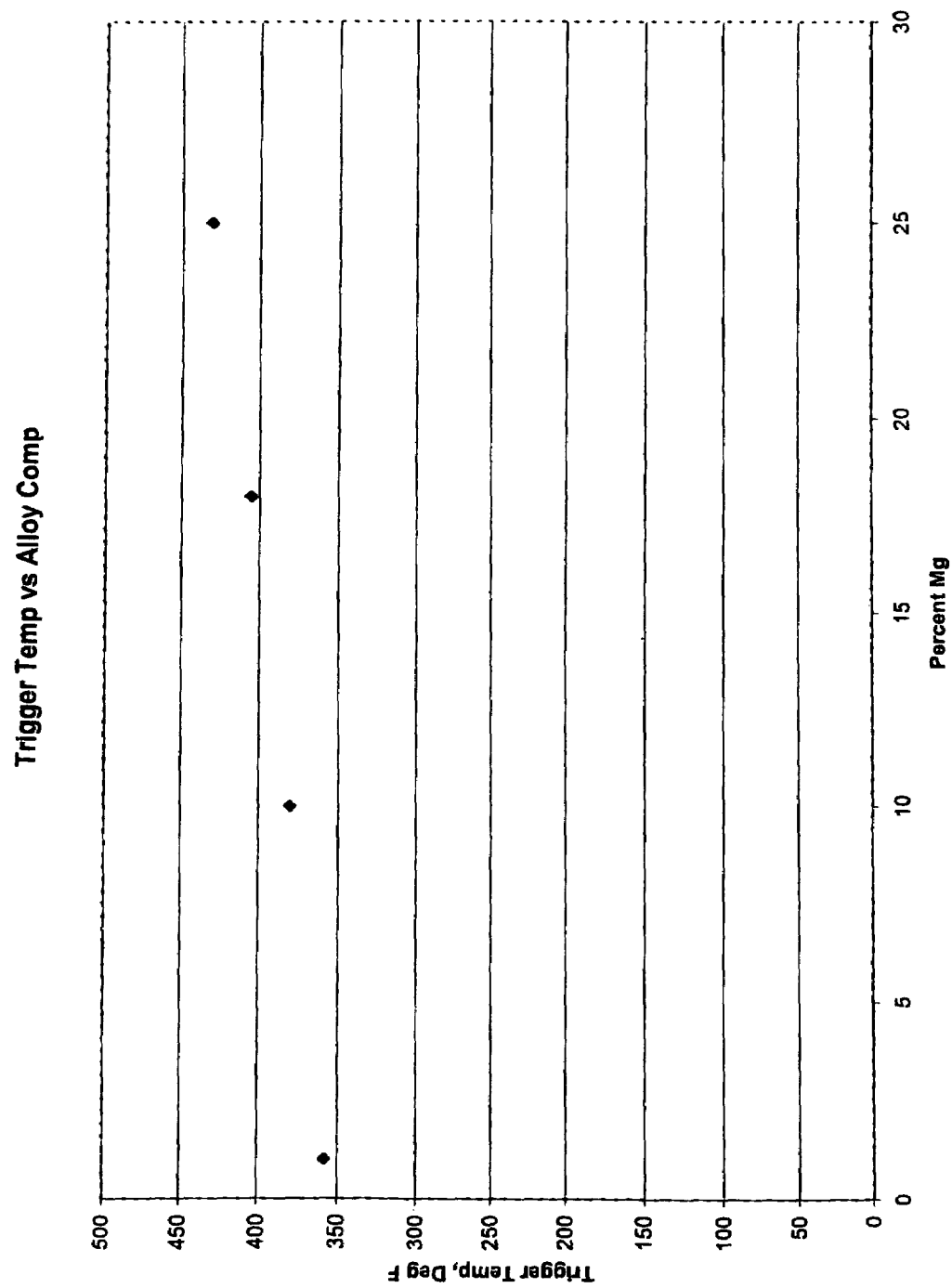
FIG. 6 is a graph showing sensor performance for trigger temperature vs percent Magnesium alloy composition according to the present invention.

FIG. 6 shows a plot of sensor trigger temperature vs percent magnesium incorporated in the lithium/magnesium alloy. The plot was generated using the data acquired from a sensor fabricated using pure lithium and pure tin wafers as well as Sensor A and Sensor B. The extrapolated portion of the plot between 19-25% Magnesium was generated with the assistance of a binary alloy phase diagram for lithium and magnesium. The trigger temperatures for 0%, 10%, and 18% magnesium are based upon measured data and the values between 0-18% should be accurate within +/−2%. The plotted trigger temperatures for 19-25% magnesium are estimated, but believed accurate within +/−5%. Experience would caution the use of more than 25% magnesium in an intermetallic thermal sensor as higher percentages of magnesium are anticipated to adversely impact sensor performance.

Each of the above intermetallic thermal sensors were made of 0.625 inch diameter wafers with the wafers of lithium/magnesium alloy and tin wafers stacked in an alternating construction. The stacking sequence was: tin wafer, lithium wafer, tin wafer, lithium wafer, tin wafer. Thus there were two lithium wafers and three tin wafers in each sensor. These wafers were pressed into a stamped sheet metal (steel) cup 0.500 inches deep. After compacting the wafer stack in the cup, an air-tight lid was press fit into the cup to seal the cup and complete the prototype sensor. No thermite or selenium were incorporated into these prototype sensors; however, thermite or selenium is utilized in other embodiments of the present invention. All alloy preparation and all sensor assembly work was conducted in a high purity argon atmosphere. Sensors were tested by placing them in an oven heated at 200° F./hour and recording air temperature and sensor temperature as a function of time.

The performance of theses sensors meets or exceeds the performance of the earlier sensors developed for the thermally initiated venting system (TIVS) in the '537 patent. Thus, successful intermetallic thermal sensors with trigger temperatures between 360-to-405+° F. have been developed and demonstrated. This represents a significant technological advance, opens up a larger range of trigger temperatures, and greatly expands the versatility and utility of lithium intermetallic thermal sensors. Depending upon the magnesium content of the Lithium/Magnesium alloy, see FIG. 6, it has been demonstrated that the intermetallic thermal sensors of the present invention will have high trigger temperatures in a range of about 360° F. to about 430° F.

The intermetallic thermal sensors of the present invention are utilized to sense temperatures that catastrophically destroy a rocket motor or heat sensitive munitions under slow, intermediate, or fast cook-off conditions. The sensors are comprised of a housing having a stable intermetallic assemblage of electronegative and active lithium/magnesium alloy, hereinafter also collectively referred to as reactants, in intimate contact or near proximity with each other. In embodiments of the present invention, these assemblages of reactants are in alternating layers or wafers of the electronegative metals and active lithium/magnesium alloy or in the form of concentric cylinders separated by a small gap. The layered reactants are deposited in one end of the housing. A thermite charge or fuse material is loaded into the other end of the housing, abutting the last deposited reactant layer. When thermite is used, a thermite trigger pellet is deposited in the interface between the last reactant layer and the thermite to enhance the reaction and thus the thermal output of the reactant layer upon initiation of the intermetallic reaction. When the entire assembly constituting the sensor is heated to the point where the active lithium/magnesium alloy begins to melt, a spontaneous and vigorous, but gasless exothermic intermetallic reaction occurs.

The thermite trigger pellet then inter-reacts with and enhances the ongoing exothermic reaction, which then produces the required amount of heat to reliably trigger the thermite charge into a reaction. One skilled in the art of thermal sensors would recognize that the resulting thermal output of the present sensors would be used to activate a variety of active systems in a variety of ways.

In other embodiments of the present intermetallic thermal sensors, alternative assemblages of the metal and alloy reactants are produced, including some employing alternating washer-shaped wafers creating an internal thermal well into which a cylindrical metal liner having a heat release or a gas-producing agent deployed with appropriate triggering agents as required. The sandwich-like assemblage or stack of the washer-shaped wafers are situated in the housing so that the thermal well liner is aligned with and extends through an opening at one end of the housing. The liner is welded to the sensor housing at the seam constituting its exit point therefrom to hermetically seal the housing. A material capable of producing a useful quantity of gas and/or thermal output when subjected to the intermetallic exothermic reaction is deposited in the well liner. When the wafer stack in the sensor housing is subjected to the melting point of one or both of its constituents it produces an intermetallic exothermic reaction which in turn causes the energetic charge in the well to react and produce a reaction including, but not limited to, gas production. The gas exiting the well liner in other embodiments is used to drive a moveable piston therein in the direction of the open end of the liner to activate a venting device or it is used to thermally activate a device which will cut through or rupture the wall of a rocket motor or munitions to prevent its catastrophic failure under adverse thermal environment conditions including fire.

Unlike pyrotechnic sensors, the intermetallic sensors of the present invention are inherently inactive until a precisely predetermined temperature, for which its assembly is tailored, is exceeded. The invention is free from the possibility of premature triggering. It does not exhibit undesirable hysteresis effects and cannot be triggered by shock, EMP, RF energy, electrostatic effects, friction, or impact. The thermal sensor of the present invention is triggered in a highly reliable and reproducible manner when heated to trigger temperatures in the range of about 360° F. to about 430° F. by a thermal stimulus. The trigger temperature is custom tailorable for specific applications by adjusting the composition of the lithium alloy to obtain a desired melting point. Sensor function is also controlled by means of fabrication and assembly. The thermal sensor element is highly reliable, non-electrical, non-mechanical, and non-pyrotechnic.

Major advantages of the present invention include, but are not limited to, providing a thermal sensor capable of being tailored to trigger at temperatures in the range of 360° F. to about 430° F. These temperatures were not achievable with previous intermetallic sensor technology. Another advantage of the intermetallic thermal sensors is that these embodiments provide a means for coupling with and triggering the operative function of a cook-off hazard mitigation system of which the sensor is an operative element. Another advantage is that these intermetallic thermal sensors can be subjected to repeated heating and cooling cycles to within 20° F. of trigger temperature without affecting the trigger temperature and thermal output. These sensors can be repeatedly exposed to a heating environment, close to the trigger temperature without undesirable hysteresis effects and without the danger of inadvertent triggering by shock, EMP, electrostatic effects, friction, or impact. This enables the intermetallic thermal sensor technology to be utilized to activate a variety of active mitigation systems in a variety of ways.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

What is claimed is:

1. A non-electrical intermetallic thermal sensor, comprising:
    a hermetically sealed housing;
    at least one layer of electronegative metal disposed in said housing, wherein said electronegative metal comprises tin (Sn); and
    at least one layer of active lithium/magnesium alloy disposed in said housing, wherein each said layer(s) of active lithium/magnesium alloy disposed in abutting interface with each said layer(s) of electronegative metal.

2. The sensor according to claim 1, wherein each said layer(s) of said electronegative metal comprises tin (Sn), each said layer(s) of active lithium/magnesium alloy comprises about 75 weight % to about 99 weight % of Lithium (Li), and about 1 weight % to about 25 weight % Magnesium (Mg).

3. The sensor according to claim 2, wherein each said layer(s) of said electronegative metal comprises tin (Sn), each said layer(s) of active lithium/magnesium alloy comprises about 80 weight % to about 90 weight % of Lithium (Li), and about 10 weight % to about 20 weight % Magnesium (Mg).

4. The sensor according to claim 1, wherein said sensors has high trigger temperatures in a range of about 360° F. to about 430° F.

5. The sensor according to claim 4, wherein said sensors has high trigger temperatures in a range of about 380° F. to about 405° F.

6. The sensor according to claim 1, further comprising at least one diffusion barrier means for inhibiting the diffusion of said active lithium/magnesium alloy layer into said electronegative layer or vice versa.

7. The sensor according to claim 6, wherein said diffusion barrier means is disposed upon a surface of one said layers in abutting contact with a surface of other said layer.

8. The sensor according to claim 7, wherein said diffusion barrier means is an electroplated metal layer that is dissolved by active lithium/magnesium alloy upon melting.

9. The sensor according to claim 8, wherein said electroplated layer includes metal comprising of at least one of copper and/or nickel.

10. The sensor according to claim 8, wherein said electroplated layer has a thickness in a range of about 0.0001 to about 0.0002 inch.

11. The sensor according to claim 6, wherein said diffusion barrier means for inhibiting the diffusion of said active lithium/magnesium alloy layer into said electronegative layer is a gaseous layer.

12. The sensor according to claim 1, wherein said layer of electronegative metal comprising tin (Sn) is substantially free of impurities.

13. The sensor according to claim 1, wherein said layer of active lithium/magnesium alloy is wafer-shaped and said layer of electronegative metal is wafer-shaped.

14. The sensor according to claim 1, wherein said layer of active lithium/magnesium alloy and said layer of electronegative metal is wafer-shaped.

15. The sensor according to claim 1, wherein said layer of active lithium/magnesium alloy is washer-shaped and said layer of electronegative metal is washer-shaped.

16. The sensor according to claim 1, wherein said housing has a centrally disposed tubular-shaped extension from one end of said housing and a continuous neck transitioning said housing into said extension or jelly roll configuration.

17. The sensor according to claim 16, further comprising a deposit of thermite within said housing extension and in abutment with the last of said layers disposed in the end of said housing adjoining said extension.

18. The sensor according to claim 17, further comprising a thermite trigger pellet disposed between said thermite and the abutting surface of said last layer disposed therein.

19. The sensor according to claim 18, wherein said pellet is composed of metallic selenium.

20. The sensor according to claim 15, wherein stacking of said washer-shaped layers in said housing defines a well.

* * * * *